United States Patent
Indyk et al.

(10) Patent No.: US 11,478,986 B2
(45) Date of Patent: Oct. 25, 2022

(54) REACTOR FOR PREPOLYMERIZATION OF A PHOTOPOLYMERIZABLE MATERIAL

(71) Applicant: Mighty Buildings, Inc., San Francisco, CA (US)

(72) Inventors: Denis Indyk, Tomsk (RU); Aleksander Trushin, Tomsk (RU); Galina Nazarova, Tomsk (RU); Vladislav Ridosh, Kemerovo (RU); Vasilii Korshikov, Tomsk (RU)

(73) Assignee: Mighty Buildings, Inc., San Francisco, CA (US)

( * ) Notice: Subject to any disclaimer, the term of this patent is extended or adjusted under 35 U.S.C. 154(b) by 146 days.

(21) Appl. No.: 16/807,955

(22) Filed: Mar. 3, 2020

(65) Prior Publication Data
US 2020/0282653 A1    Sep. 10, 2020

Related U.S. Application Data

(60) Provisional application No. 62/813,259, filed on Mar. 4, 2019.

(51) Int. Cl.
| | | |
|---|---|---|
| *B29C 64/329* | (2017.01) | |
| *B29C 64/106* | (2017.01) | |
| *B29C 64/264* | (2017.01) | |
| *B29C 64/25* | (2017.01) | |
| *B29C 64/227* | (2017.01) | |
| *B29C 64/393* | (2017.01) | |
| *B33Y 50/02* | (2015.01) | |
| *B33Y 10/00* | (2015.01) | |
| *B33Y 30/00* | (2015.01) | |
| *B33Y 40/20* | (2020.01) | |

(52) U.S. Cl.
CPC .......... *B29C 64/329* (2017.08); *B29C 64/106* (2017.08); *B29C 64/227* (2017.08); *B29C 64/25* (2017.08); *B29C 64/264* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
CPC ... B29C 64/329; B29C 64/264; B29C 64/393; B29C 64/227; B29C 64/106; B29C 64/25; B33Y 10/00; B33Y 30/00; B33Y 50/02; B33Y 40/20
USPC ......................................................... 264/40.1
See application file for complete search history.

(56) References Cited

U.S. PATENT DOCUMENTS

| | | | | |
|---|---|---|---|---|
| 4,767,577 A | * | 8/1988 | Muller | .................... B30B 11/24 149/100 |
| 2011/0315316 A1 | * | 12/2011 | Welke | ...................... C09J 7/387 156/327 |
| 2019/0112499 A1 | | 4/2019 | Rolland et al. | |

* cited by examiner

Primary Examiner — Joseph S Del Sole
Assistant Examiner — Lawrence D. Hohenbrink, Jr.
(74) Attorney, Agent, or Firm — Cognition IP, P.C.; Edward Steakley; Justin White

(57) ABSTRACT

Systems, devices, and methods are provided for producing a 3d-printable prepolymerized material. A device can include a reactor having a body including a housing having an exterior, and interior cavity, an input end, and an output end opposite of the input end, the output end comprising an opening, a loading hopper operably connected to the interior cavity of the housing, an auger supported within the interior cavity of the housing, a driving motor operably connected to the body configured to drive the auger; and a light emitting unit operably connected to the exterior of the housing.

24 Claims, 4 Drawing Sheets

REACTOR FOR PREPOLYMERIZATION OF A PHOTOPOLYMERIZABLE MATERIAL

CROSS-REFERENCE TO RELATED APPLICATION

This application claims the benefit of U.S. Provisional Patent Application No. 62/813,259 filed on Mar. 4, 2019 and entitled "A Reactor for Prepolymerization of a Photopolymerizable Material," which application is hereby incorporated by reference in its entirety.

BACKGROUND

Three-dimensional (3D) printing, also known as additive manufacturing, is a technique that deposits materials to exact location, thus resulting in significantly less material wastage than traditional manufacturing techniques, which typically form parts by reducing or removing material from a bulk material. Prototyping and manufacturing, art, dentistry, medical devices, and jewelry are traditional industries of 3D printing applications. During the last five years, building components for construction have become an important application to the construction business.

An improved method of the large scale 3D printing process for building components and building modules can be beneficial to the construction industry and the environment.

BRIEF SUMMARY

The present disclosure generally relates to systems, devices, and methods for producing 3d-printable prepolymerized material that are utilized in big area 3D printing solutions. In one aspect, an apparatus includes a body including a housing having an exterior, and interior cavity, an input end, and an output end opposite of the input end, the output end comprising an opening. The apparatus can also include a loading hopper operably connected to the interior cavity of the housing. The apparatus can also include an auger supported within the interior cavity of the housing. The apparatus can also include a driving motor operably connected to the body configured to drive the auger. And the apparatus can include a light emitting unit operably connected to the exterior of the housing.

In one aspect, the apparatus is a reactor for prepolymerization of a photopolymerizable material.

In one aspect, the housing can include a cylindrical housing having a cylindrical exterior, and a hollow cylindrical interior configured to support the auger. In one aspect, the auger is a flexible material. In one aspect, the housing can be transparent such that material disposed inside the interior cavity of the body can be exposed to light emitted from the light emitting unit. In one aspect, the light emitting unit can be located at a portion of the exterior between the input end and output end such that only a portion of material is exposed to light emitted from the light emitting unit.

In one aspect, the apparatus can also include a second light emitting unit operable connected to the exterior of the housing, in an opposite side of the exterior of the light emitting unit. In one aspect, the loading hopper can be operably connected to the interior cavity of the housing through an inlet of the housing, located near the input end of the housing. In one aspect, the opening can be configured to transmit prepolymerized material from the body.

In one aspect, a system can include a reactor including a body having a housing, an auger, a motor configured to drive the auger, a shaft operably connecting the auger to the motor, a loading hopper, the reactor configured to receive and process a photopolymerizable material. In one aspect, the system can include one or more light emitting units configured to prepolymerize the photopolymerizable material. In one aspect, the system can include one or more sensors. And in one aspect, the system can include a control unit configured to receive information from the one or more sensors and control motor and the one or more light emitting units.

In one aspect, the housing can be a cylindrical housing having a cylindrical exterior, and a hollow cylindrical interior configured to support the auger member. In one aspect, the one or more sensors can include one or more viscosity sensors. In one aspect, at least one viscosity sensor can be located near an output end of the reactor on the housing of the reactor. In one aspect, a viscosity of the photopolymerizable material can be detected to determine a degree of polymerization of the photopolymerizable material.

In one aspect, the system can also include one or more drivers operably connected to the control unit. In one aspect, the system can also include a first driver configured control an intensity of light emitted by the one or more light emitting units. In one aspect, the system can also include a first driver configured to control a power output of the motor.

And in one aspect, the photopolymerizable material can be an uncured liquid material.

In one aspect, a method for producing a composite material can include receiving a photopolymerizable material into a load hopper of a reactor, transmitting the photopolymerizable material into a cylindrical body of the reactor, the cylindrical body having an inlet located near a first end of the cylindrical body and an output end opposite of the first end, from the load hopper, moving the photopolymerizable material from the first end to the output end, processing the photopolymerizable material as the photopolymerizable material moves from the first end to the output end to produce a processed material, and releasing the processed material from the reactor out of the output end.

In one aspect, processing the photopolymerizable material can include curing the photopolymerizable material with one or more light emitting units. In one aspect, the method can also include sensing and determining a viscosity of at least a portion of the processed material. In one aspect, the method can also include controlling an intensity of light emitted by the one or more light emitting units curing the photopolymerizable material based on the viscosity of the processed material determined. In one aspect, the method can also include controlling a speed of the photopolymerizable material moving from the first end to the output end based on the viscosity of the processed material determined.

And in one aspect, the method can also include determining a degree of polymerization of the processed material from the reactor.

Other examples are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
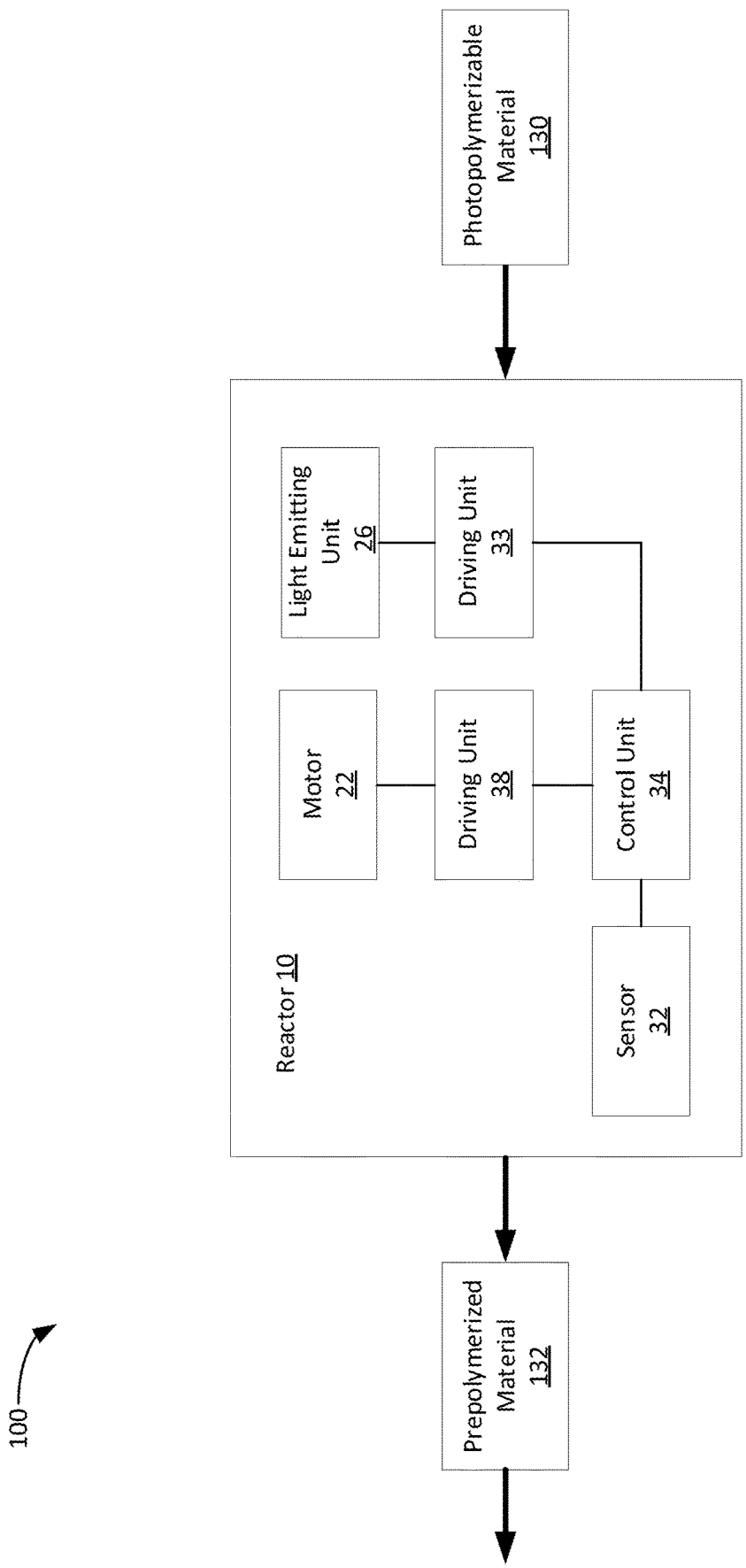
FIG. 1 illustrates a system diagram of a 3d-printable prepolymerized material producing system in accordance with various aspects of the subject technology.

In this specification, reference is made in detail to specific examples of the disclosure. Some of the examples or their aspects are illustrated in the drawings.

For clarity in explanation, the disclosure has been described with reference to specific examples, however it should be understood that the disclosure is not limited to the described examples. On the contrary, the disclosure covers alternatives, modifications, and equivalents as may be included within its scope as defined by any patent claims. The following examples of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially.

A prepolymer, known as a polymerization precursor, is a monomer or a plurality of monomers that have been reacted to an intermediate molecular mass state. The prepolymer is generally used at predetermined stages of polymer production for forthcoming use in many applications such as 3D printing, manufacture of building materials, application of coatings, or the like. The main advantages of the prepolymerized products are their 3d-printability achieved by having higher viscosity that provides better adhesive properties, better resistance to the environment, lower shrinkage rate in comparison with the non-prepolymerized materials, etc.

The main prerequisite for material extrusion, without a supporting structure from the 3D printer into a three-dimensional space, is that the material should be precured to a condition at which the material can maintain its shape upon its exit from an extruder. In previous applications, UV beams have been focused on the extruded thread for precuring the material to a state in which it can maintain its integrity and shape without support but at the same time allows to configure three-dimensional objects. In other previous applications, the extruded material has been laid onto a support in a single layer or in a layer-by-layer manner for forming coatings of a required thickness. In that case, the material can be applied onto the support or a substrate in a prepolymerized condition for curing in the ambient atmosphere.

A variety of other prepolymerization applications, which constitute elements of multicomponent systems for products prepolymerization have been attempted. The prepolymerized products are subsequently used as intermediate products for feeding to other reactors or processing devices for following treatment in a production line.

However, in such devices, the prepolymerization stage occurs in areas outside the device housing.

The following system, device, apparatus, and a method for producing a prepolymerized product of a photopolymerizable material is described below. The discussion generally relates to a device configured for material polymerization, in particular to a reactor for prepolymerization of photopolymerizable materials such as polyvinyl cinnamate, polyamide, polyisoprene, polyimides, epoxies, acrylics etc., which are polymerized or cured when irradiated by a light emitted from light sources, including UV radiation or other radiation sources. In one example, the materials can be used in combination with additives such as polymerization initiators. Photopolymers that constitute products of photopolymerization can be used applications such as 3D printing, medicine, construction, etc.

In one example, a prepolymerization reactor of the present disclosure can be used for printing large-sized construction objects including walls, ceilings, floors, or modules/rooms, or a one-piece combination as a whole.

FIG. 1 illustrates a prepolymerization reactor of the invention for obtaining a prepolymerized material by photopolymerization. In this example, a reactor 10 can include a body, a loading hopper operably connected to the body to load a photopolymerizable material 130, typically uncured liquid material, from the loading hopper into the body of the reactor 10. The reactor 10 can also include a motor 22, configured to drive an auger disposed within the body to move any prepolymerized material, for example prepolymerized material 132 from one end of the body to another end of the body, and then released from the reactor 10. The reactor 10 can also include a light emitting unit 26 operably attached to an exterior of the body of the reactor 10 configured to radiate light into an interior cavity of the body.

In this example, the reactor 10 can one or more sensors 32 configured to sense a viscosity of prepolymerized material 132 of the photopolymerizable material 130 loaded from the loading hopper into the body of the reactor 10, and then moved from one end of the body to another end of the body, such that the photopolymerizable material 130 can be cured into a prepolymerized material 132. In one example, the reactor 10 can also include a control unit 34 for controlling an intensity of light emitted into the interior cavity of the body through a driving unit 33 to adjust and alter the power output or intensity of the light emitting unit 26. In one example, the control unit 34 can also control the motor 22 of the reactor 10 through a driving unit 38 to adjust and alter the power output or speed of the motor 22 which effectively allows the control unit 34 to control the speed at which the photopolymerizable material 130 received by the body of the reactor 10 moves from one end to the other, which affects the amount of time a portion of the photopolymerizable material 130 can experience radiation from the light emitting unit 26.

In one example, the control unit 34 can be controlled by a user providing inputs to the reactor 10 for setting the speed of the motor 22, the intensity of the light emitting unit 26, or a combination thereof. In one example, the control unit 34 can automatically determine, control, and adjust if needed, the speed of the motor 22, intensity of the light emitting unit 26, or a combination thereof, based on the sensor reading of the one or more sensors 32 connected to body of the reactor 10.

Figure 2:
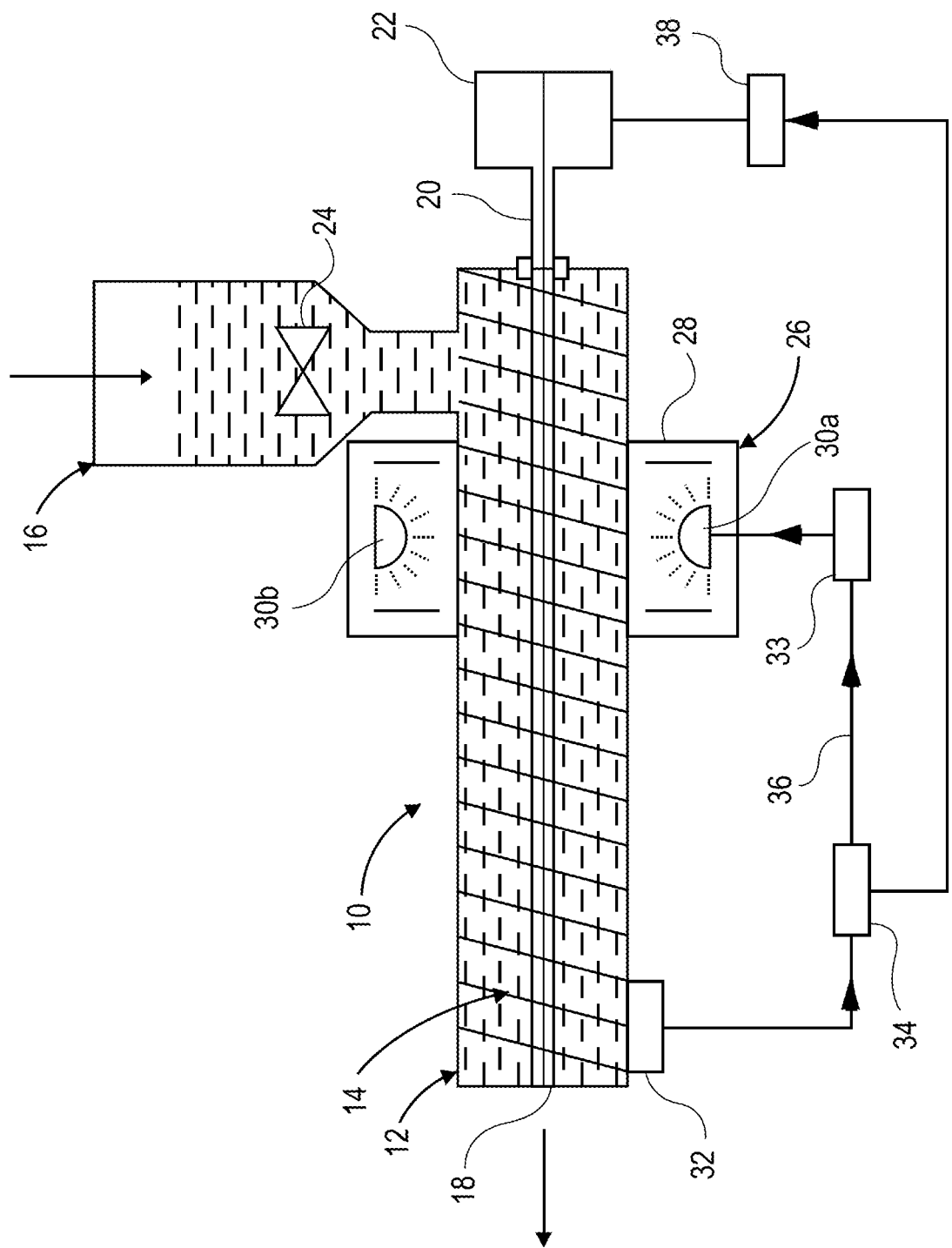
FIG. 2 illustrates an example apparatus of a reactor in accordance with various aspects of the subject technology.

FIG. 2 illustrates an example apparatus of a reactor for prepolymerization of a photopolymerizable material. In this example, a schematic of a longitudinal sectional view of a reactor 10 is shown. In this example, the reactor 10 can include a body 12, a loading hopper 16, an auger 14, a motor 22, and a shaft 20 connecting the motor 22 with the auger 14, and one or more light emitting unit 26, an in this case a pair of light emitting units disposed on opposite sides of the body 12. The reactor 10 can also include a control unit 34, one or more sensors 32, a driving motor 33 and driving motor 38.

In one example, the body 12 can include a housing having an exterior. The body 12 can also include a hollow interior cavity, an input end, and output end 18 opposite to that of the input end, with each of the output end 18 and input end having an opening. In this example, the housing can be cylindrically shaped with one annular end of the housing having the input end and the other annular end of the housing having the output end 18. The auger 14 can be supported within the interior cavity of the housing. In this example, the size of the auger 14 can be large enough to be substantially flush against the interior walls of the interior cavity of the body 12 such that under operation, the auger 14 can move any material, such as photopolymerizable material or cure prepolymerized material from one end of the body to another end and out output end 18 of the housing. The auger 14 is rotationally installed and disposed inside the housing with a sliding fit into the cylindrical shape of the housing.

In one example, the body 12 is comprised of transparent material permeable to light waves from the visible spectrum, for example visible light having a wavelength of 700 nanometers (nm) to 400 nm and ultraviolet ray spectrum, for example ultraviolet light having a wavelength of 400 nanometers (nm) to 10 nm to allow light radiation coming from an exterior of the body 12, such as from the light emitting unit 26 into the interior cavity of the body. The transparency allows the light treating of any material, such as photopolymerizable material and allow for visual control of the process of treating the photopolymerizable material. In one example, the body 12 is transparent only in a portion of the body such as a photopolymerization zone so that only the portion of the body can receive light radiation from an exterior light emitting unit, which allows the curing process to be controlled more accurately.

In one example, the auger 14 is supported within the interior of the cavity of the housing. In this example, the auger 14 can be made from a flexible material. The flexible material can maintain a tight contact between the tips of the auger threads and the inner surface of the cylindrical housing of the body 12, which can prevent mixing of the portions of photopolymerizable material located between two threads of the auger 14. This improves the prepolymerization process since photopolymerizable material is prevented from flowing backwards during a rotation of the auger 14. In one example, the flexible auger 14 is disposed inside the cavity such that under operation, the auger does not scratch on the internal surface of the reactor during the long continuous work and therefore does not impair transparency of the reactor housing. Having a fractional light transparency, the auger 14 absorbs less light to improve the productivity of the prepolymerization process.

In one example, the loading hopper 16 is operably connected to the body 12 and the interior cavity of the housing through an inlet of the housing, located near the input end of the housing. The material transmitted from the loading hopper 16 to the body 12 is transmitted to one end of the body such near the input end such that the auger 14 will move the material transmitted from one end of the body 12 to another end such as the output end. In one example, the material can be an uncured liquid photopolymerizable material which can be loaded into the loading hopper itself from an opening of the loading hopper 16. If necessary, the material loaded into the loading hopper 16 can be stirred with a stirrer 24 and then enters the cavity of the cylindrical interior cavity of the body 12. The loading hopper 16 can also be made of a transparent material.

In this example, the auger 14 can be driven by a driving motor 22 connected by a shaft 20. The shaft 20 can enter the body 12 through the input end of the body 12. When the photopolymerized material is prepolymerized by the curing process, the prepolymerized material can leave the reactor 10 from the body 12 through an extrusion nozzle at output end 18. The output end 18 can additionally be connected to a transfer connector such as a pipe for transporting the outputted material, such as prepolymerized material, to another chamber, reactor, or another component for a 3D printing process that is configured to and use prepolymerized material.

As the auger 14 moves the material received from the loading hopper 16 from a first end near or at the input end of the body 12 to the output end 18, one or more light emitting units 26, connected to the exterior of the housing, radiates light into the cavity of the body 12, which cures the material such as photopolymerizable material into a prepolymerized material of a desired viscosity to be used by another component for a 3D printing process.

In this example, the light emitting unit 26 for photopolymerizing of the material to a prepolymerization state, can include an annular holder 28 that contains a plurality of circumferentially arranged light sources, e.g., LEDs, only two of which, i.e., LEDs 30a and 30b are shown in FIG. 2. It should be known that any number of LED units can be connected to the exterior of the housing of the body 12 to shine light into the interior cavity of the housing to cure any material inside the cavity. The LEDs emit light of a predetermined intensity and a wavelength directed in the radial inward direction to the photopolymerizable material, which is continuously displaced by the auger 14 toward the output end 18 at a predetermined speed, which can be controlled to speed up or slow down. The light reaches the material through the wall of the transparent housing.

In one example, the light emitting unit 26 can be located between the loading hopper 16 and the output end 18. In one example, the light emitting units 26 can be located closer to the loading hopper 16. In one example, the light emitting unit can be located at a portion of the exterior between the input end and the output end 18 such that only a portion of the material is exposed to light emitted from the light emitting units 26. For illustrative purposes only, each of the LED's 30a and 30b can be disposed on opposite ends of the exterior of the housing of the body 12. However, a plurality of light emitting units 26 can be disposed along an entire surface of the housing, forming a ring, such that the LED's can shine a uniform amount of light into the cavity.

In one example, a photopolymerizable material is deposited into the loading hopper 16 and transmitted into the body 12 of the reactor 10. As the photopolymerizable material moves from one end of the body 12 to the output end 18 of the body 12, the photopolymerizable material will experience light radiation configured to treat the photopolymerizable material, at least when the photopolymerizable material passes through a portion of the body 12 having light emitting units 26 disposed on the exterior of the portion of the body 12. The output of the treated photopolymerizable material can be prepolymerized material.

In this example, a control unit 34 can be configured to monitor, maintain, adjust, or combination thereof, the treating process by monitoring, maintaining, adjusting, or a combination thereof, the speed at which the photopolymerizable material moves along the body 12 or the intensity of light emitted from the light emitting unit 26, or a combination of both. In this example, the control unit 34 can control a driver 33 configured to receive signals via a feedback line 36 to control the LED's of the one or more light emitting units 26. In this example, the control unit 34 can also control a driver 38 configured to receive signals via a feedback line 36 to control the motor 22 to control the speed at which the auger 14 can rotate.

In order to maintain the obtained prepolymer in a state of a desired degree of prepolymerization, the reactor 10 can include one or more sensors including one or more viscosity sensors 32. The viscosity sensor can be configured to measure viscosity of the material that has already been treated by the light emitting units 26 and is about the enter the output end 18 of the body 12 and release from the reactor 10. Since the viscosity of a polymerized material is proportional to the degree of polymerization (DP) and that the viscosity increases with increasing degree of polymerization. Thus, controlling the speed of the auger 14, which controls the amount of time a photopolymerizable material can experience radiation, and controlling the intensity of the LED's, which controls how much radiation at a time the photopolymerizable material can experience as it is being treated by the LED's, can determine the desired degree of prepolymerization of the photopolymerizable material. Thus, by knowing the characteristics of the polymerizable material and dependence of the viscosity from the degree of polymerization of a specific material, it would be possible to determine the degree of polymerization.

In one example, under operation, the photopolymerizable material becomes prepolymerized by photopolymerization when the material passes through the body 12 through at least a portion of the body that is a prepolymerization zone embraced by the one or more annular holders 28 that contains a plurality of circumferentially arranged LEDs, such as LEDs 30a and 30b. The intensity of light emitted by the light sources and, hence the degree of polymerization of the material being treated, is controlled in terms of viscosity of the outlet product through the feedback of the viscosity sensor 32 with the light emitting unit 26 via the control unit 34. Alternatively, the degree of polymerization may be controlled by adjusting the rotation speed of the motor 22 through the link of the control unit 34 with the driver 38 of the motor 22.

In this example, at least one viscosity sensor can be located near the output end 18 of the reactor 12. The viscosity sensor can sense viscosity of the material sensed, and transmit the information to the control unit 34, which allows the control unit 34 to change the speed or intensity of the movement or radiating light.

In one example, light sources other than the LEDs can be used, for example, a laser light source. The degree of polymerization of the material can be controlled by devices other than a viscosity sensor.

Figure 3A:
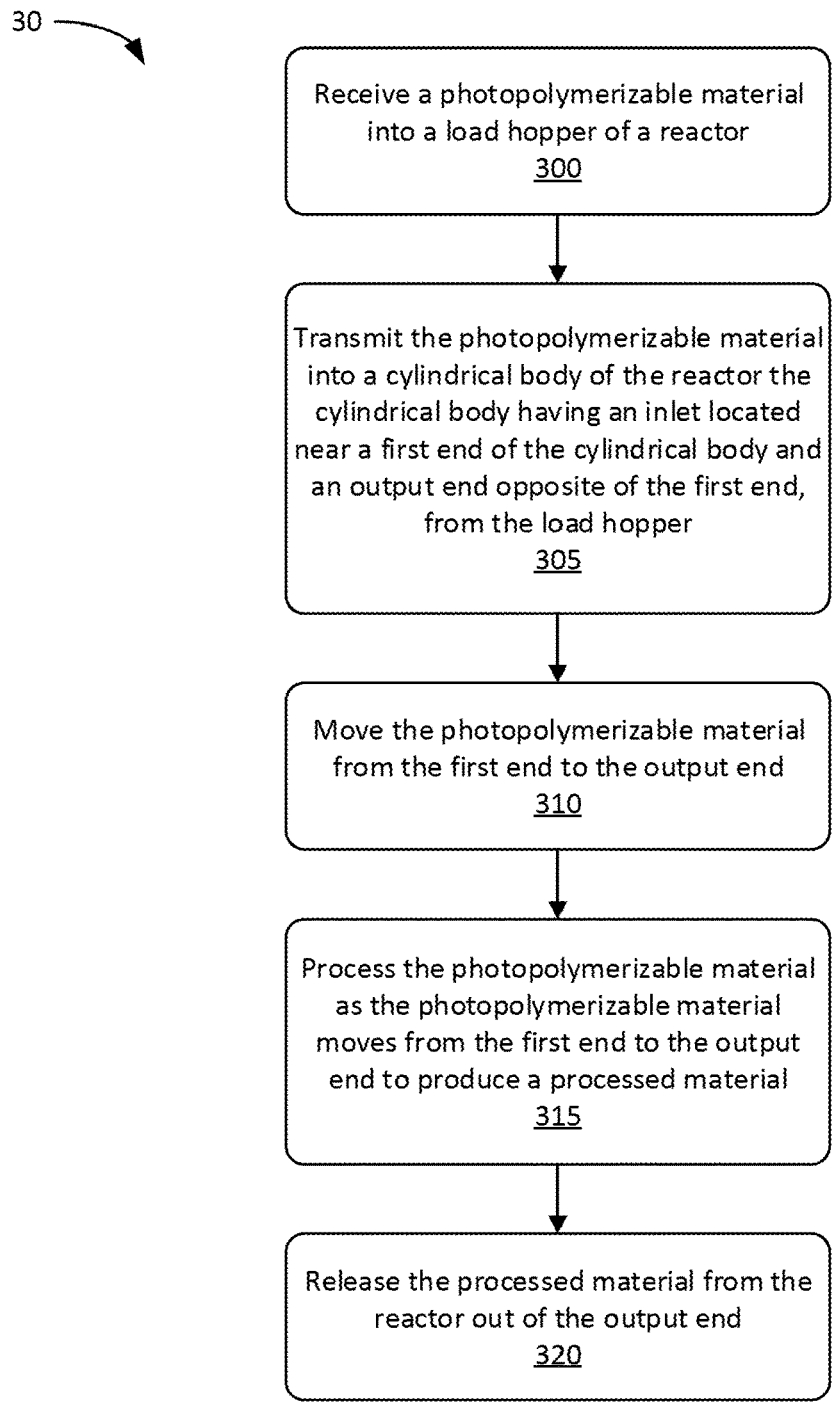
FIGS. 3A-3B illustrate example flow processes of producing a 3d-printable prepolymerized material in accordance with various aspects of the subject technology.
Figure 3B:
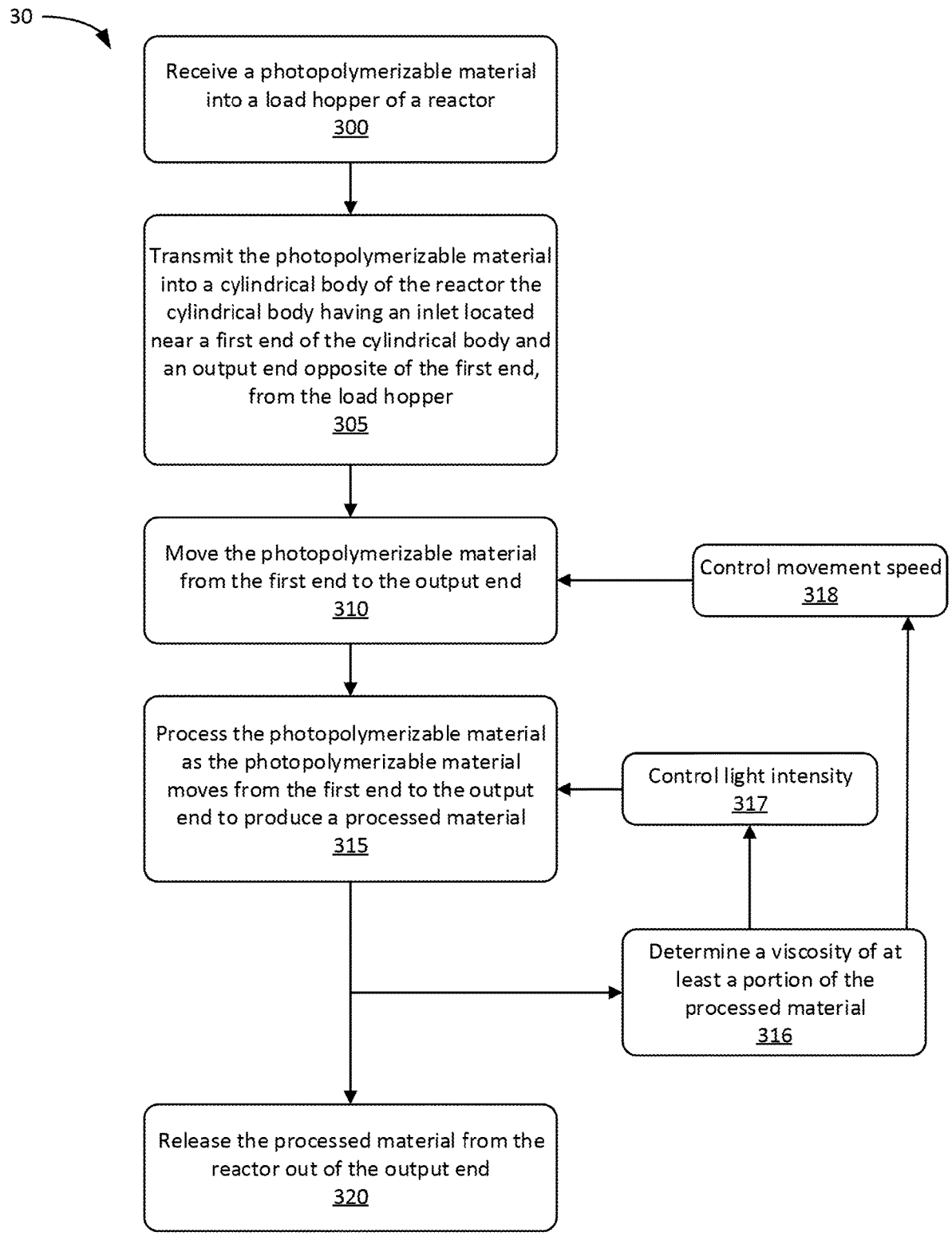

FIGS. 3A-3B illustrate example flow processes of producing a prepolymerized material or a 3D printing process.

In the example flow diagram 30 of FIG. 3A, at block 300, an apparatus can receive a photopolymerizable material into a load hopper of a reactor.

At block 305, the apparatus can transmit the photopolymerizable material into a cylindrical body of the reactor, the cylindrical body having an inlet located near a first end of the cylindrical body and an output end opposite of the first end, from the load hopper.

At block 310, the apparatus can move the photopolymerizable material from the first end to the output end.

At block 315, the apparatus can process the photopolymerizable material as the photopolymerizable material moves from the first end to the output end to produce a processed material. In this example, processing the photopolymerizable material can include curing the photopolymerizable material with one or more light emitting units.

And at block 320, the apparatus can release the processed material from the reactor out of the output end.

Additionally, as illustrated in FIG. 3B, flow diagram 30 can include additional steps. For example, at block 316, the apparatus can determine a viscosity of at least one portion of the processed material. In this example, the step can be performed in conjunction with any of the above steps, or after the step at block 315. In this example, the apparatus can determine the viscosity of the portion of the processed material by sensing the viscosity with one or more sensors, which effectively allows the apparatus to determine a degree of polymerization of the processed material.

At block 317, the apparatus can control an intensity of light emitted by the one or more light emitting units curing the photopolymerizable material based on the viscosity of the processed material determined.

And at block 318, the apparatus can control a speed of the photopolymerizable material moving from the first end to the output end based on the viscosity of the processed material determined.

The terminology used herein is for the purpose of describing particular aspects only and is not intended to be limiting the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. An apparatus, comprising:
   a body including a housing having an exterior, and interior cavity, an input end, and an output end opposite of the input end, the output end comprising an opening;
   a loading hopper operably connected to the interior cavity of the housing;
   an auger supported within the interior cavity of the housing;
   a driving motor operably connected to the body configured to drive the auger; and
   a light emitting unit operably connected to the exterior of the housing, wherein the light emitting unit is configured to emit light into the interior cavity of the housing while a photopolymerizable material passes through the interior cavity of the housing, and wherein the light emitting unit is also configured to have the intensity of its emitted light be adjusted while the photopolymerizable material is within the interior cavity of the housing based on sensed properties of the photopolymerizable material while the photopolymerizable material remains within the interior cavity of the housing.

2. The apparatus of claim 1, wherein the apparatus is a reactor for prepolymerization of the photopolymerizable material.

3. The apparatus of claim 1, wherein the housing comprises a cylindrical housing having a cylindrical exterior, and a hollow cylindrical interior configured to support the auger.

4. The apparatus of claim 1, wherein the auger is a flexible material.

5. The apparatus of claim 1, wherein the housing is transparent such that material disposed inside the interior cavity of the body can be exposed to light emitted from the light emitting unit.

6. The apparatus of claim 5, wherein the light emitting unit is located at a portion of the exterior between the input end and output end such that only a portion of material is exposed to light emitted from the light emitting unit.

7. The apparatus of claim 1, further comprising a second light emitting unit that is operably connected to the exterior of the housing, in an opposite side of the exterior of the light emitting unit.

8. The apparatus of claim 1, wherein the loading hopper is operably connected to the interior cavity of the housing through an inlet of the housing, located near the input end of the housing.

9. The apparatus of claim 1, wherein the opening is configured to transmit 3d-printable prepolymerized material from the body.

10. A system for producing 3d-printable and prepolymerized material, the system comprising:
a reactor comprising a body having a housing, an auger, a motor configured to drive the auger, a shaft operably connecting the auger to the motor, and a loading hopper, the reactor configured to receive and process a photopolymerizable material;
one or more light emitting units configured to prepolymerize the photopolymerizable material;
one or more sensors; and
a control unit configured to receive information from the one or more sensors and control the motor and the one or more light emitting units.

11. The system of claim 10, wherein the housing is a cylindrical housing having a cylindrical exterior, and a hollow cylindrical interior configured to support the auger member.

12. The system of claim 10, wherein the one or more sensors includes one or more viscosity sensors.

13. The system of claim 12, wherein at least one viscosity sensor is located near an output end of the reactor on the housing of the reactor.

14. The system of claim 12, wherein a viscosity of the photopolymerizable material is detected to determine a degree of polymerization of the photopolymerizable material.

15. The system of claim 10, further comprising one or more drivers operably connected to the control unit.

16. The system of claim 15, further comprising a first driver configured control an intensity of light emitted by the one or more light emitting units.

17. The system of claim 15, further comprising a first driver configured to control a power output of the motor.

18. The system of claim 15, wherein the photopolymerizable material is an uncured liquid material.

19. The system of claim 10, wherein the one or more light emitting units include one or more annular holders that each contain one or more light sources.

20. The system of claim 19, wherein the one or more light sources are LEDs or a laser light source.

21. A system configured to produce a prepolymerized material, the system comprising:
a reactor having a body that includes a housing and an interior cavity, an auger, a motor configured to drive the auger, a shaft operably connecting the auger to the motor, and a loading hopper, wherein the reactor is configured to receive and process a photopolymerizable material;
one or more light emitting units having one or more light sources, wherein the one or more light emitting units are configured to prepolymerize the photopolymerizable material by emitting light into the interior cavity of the housing while the photopolymerizable material is within the interior cavity of the housing;
one or more sensors configured to measure a property of the photopolymerizable material while the photopolymerizable material is within the interior cavity of the housing; and
a control unit configured to receive information from the one or more sensors and control the motor, the one or more light emitting units, or both based on the information received from the one or more sensors.

22. The system of claim 21, wherein the housing is a cylindrical housing having a cylindrical exterior and a hollow cylindrical interior configured to support the auger.

23. The system of claim 21, wherein the one or more sensors includes one or more viscosity sensors, and wherein the one or more viscosity sensors are configured to facilitate a determination of a degree of polymerization of the photopolymerizable material while the photopolymerizable material is within the interior cavity of the housing.

24. The system of claim 21, further comprising:
a first driver operably connected to the control unit and configured to control an intensity of light emitted by the one or more light emitting units while the photopolymerizable material is within the interior cavity of the housing; and
a second driver operably connected to the control unit and configured to control a power output of the motor while the photopolymerizable material is within the interior cavity of the housing.

* * * * *